United States Patent
Klein et al.

(10) Patent No.: US 6,322,165 B1
(45) Date of Patent: *Nov. 27, 2001

(54) ELECTRONICALLY ADJUSTABLE BRAKE ACTUATION SYSTEM

(75) Inventors: Andreas Klein, Bad Homburg; Ulrich Neumann, Rossdorf; Wolfgang Schieblich, Weiterstadt; Johan Jungbecker, Badenheim; Lothar Kunze, Hofheim; Manfred Rüffer, Sulzbach; Ronald Bayer, Mülheim; Bernhard Schmittner, Rossdorf, all of (DE)

(73) Assignee: Continental Teves AG & Co., OHG, Frankfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/242,416

(22) PCT Filed: Jun. 9, 1998

(86) PCT No.: PCT/EP98/03444

§ 371 Date: Jan. 7, 2000

§ 102(e) Date: Jan. 7, 2000

(87) PCT Pub. No.: WO98/57833

PCT Pub. Date: Dec. 23, 1998

(30) Foreign Application Priority Data

Jun. 14, 1997 (DE) .............................................. 197 25 298

(51) Int. Cl.⁷ .................................................... B60T 8/36
(52) U.S. Cl. .................................. 303/119.2; 303/119.2; 303/115.2; 303/DIG. 10
(58) Field of Search ............................. 303/115.2, 119.2, 303/DIG. 10

(56) References Cited

U.S. PATENT DOCUMENTS 3,936,095 * 2/1976 Every ..................................... 303/21
4,812,777   3/1989 Shirai .
4,940,295 * 7/1990 Adachi et al. ........................ 303/117

(List continued on next page.)

FOREIGN PATENT DOCUMENTS 34 24 912   1/1986  (DE) .
36 03 533   8/1986  (DE) .

(List continued on next page.)

OTHER PUBLICATIONS

"Four Channel Proportional Brake System Using 3–Way Isolation Valves" Research Disclosure, No. 371, Mar. 1, 1995, p. 175 XP000512389.

(List continued on next page.)

Primary Examiner—Robert J. Oberleitner
Assistant Examiner—Benjamin A. Pezzlo
(74) Attorney, Agent, or Firm—Rader, Fishman & Grauer PLLC

(57) ABSTRACT

An electronically controllable brake actuation system for motor vehicles is proposed, with a master brake cylinder (2), with a pressureless pressure medium reservoir (3), with a pressure source (20) which can be controlled by means of an electronic control unit (32), by means of which pressure can be applied to the wheel brakes (7, 8, 9, 10) of the vehicle, which can be connected by means of at least one hydraulic connection (11, 14), which can be shut off by means of a separating valve (12, 15), to the master brake cylinder (2), with a device (13, 33) for the recognition of the driver's wish to slow down, and with at least one separating piston arrangement (16) which is connected before the wheel brakes (7–10), where the first chamber (17) of this separating piston arrangement can be connected to the master brake cylinder (2), and its second chamber (19) can be connected through a valve device (27) to the pressure source (20) or to the pressure medium reservoir (3).

Figure 1:
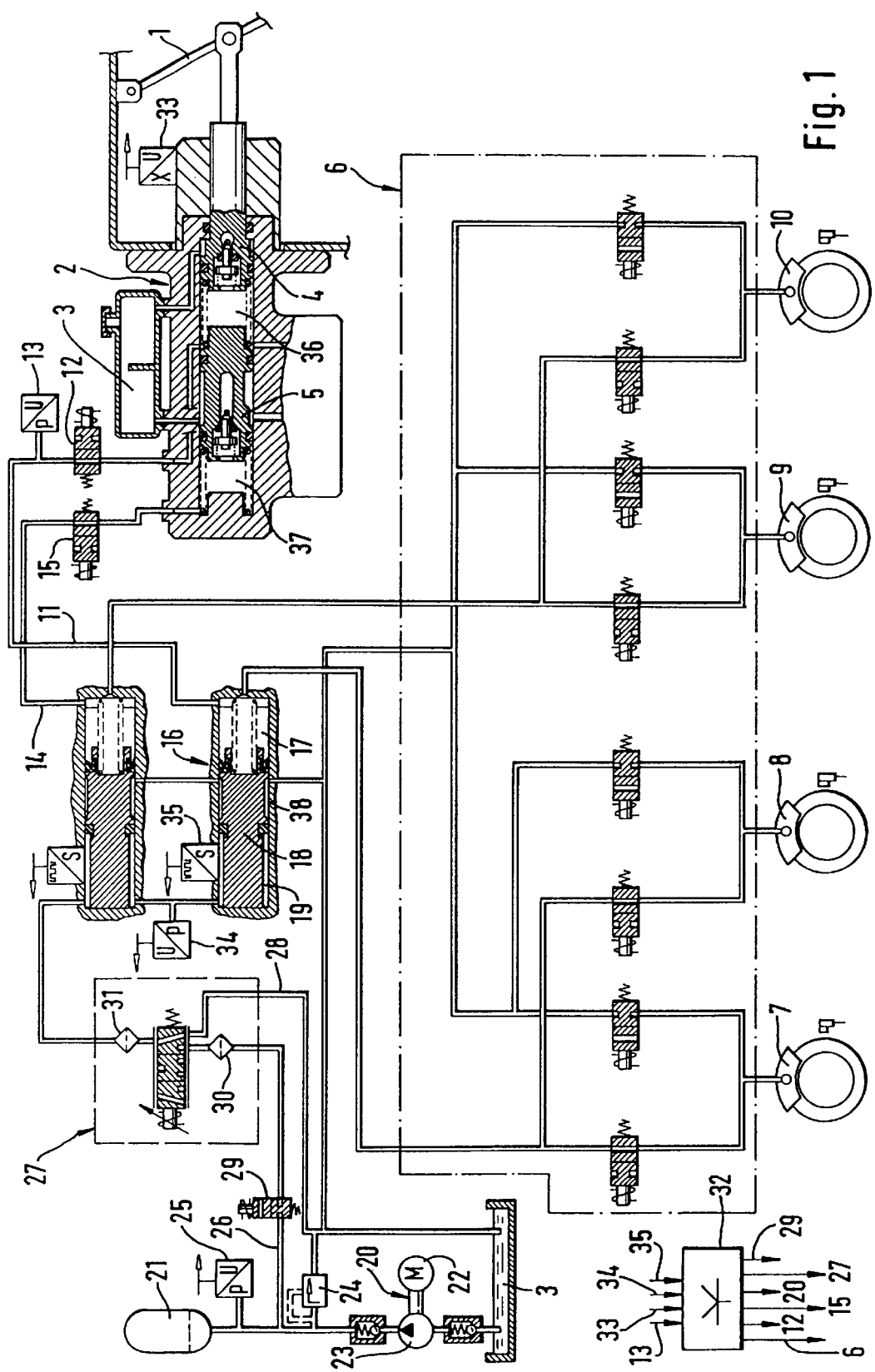

In order to improve the ability to control the brake pressure of such a system, the proposal is made according to the invention that the valve device (27) be designed as a multiple position valve of the slide type, and that a switching seat valve (29) be inserted in the connection between the multiple position valve (27) and the pressure source (20).

17 Claims, 7 Drawing Sheets

U.S. PATENT DOCUMENTS

| | | | |
|---|---|---|---|
| 5,106,170 | * | 4/1992 | Matsuda et al. .................. 303/92 |
| 5,114,216 | * | 5/1992 | Tsuda et al. .................... 303/117 |
| 5,150,951 | * | 9/1992 | Leiber et al. ................... 303/100 |
| 5,172,963 | * | 12/1992 | Brown ............................ 303/113.3 |
| 5,221,126 | * | 6/1993 | Inoue ............................. 303/13 |
| 5,249,854 | * | 10/1993 | Yamada .......................... 303/115.4 |
| 5,372,412 | | 12/1994 | Yagi . |
| 5,613,740 | | 3/1997 | Kawamoto et al. . |
| 5,647,647 | * | 7/1997 | Kato et al. ..................... 303/122.09 |
| 5,810,456 | * | 9/1998 | Inagaki et al. ................. 303/116.1 |
| 5,855,417 | * | 1/1999 | Johnston et al. ............... 303/3 |
| 5,979,999 | * | 11/1999 | Poertzgen et al. ............. 303/116.1 |
| 5,988,769 | * | 11/1999 | Inagaki et al. ................. 303/117.1 |
| 6,033,036 | * | 3/2000 | Ruffer et al. ................... 303/114.1 |
| 6,135,572 | * | 10/2000 | Worsdorfer et al. ............ 303/10 |

FOREIGN PATENT DOCUMENTS

| | | |
|---|---|---|
| 39 33 797 | 4/1991 | (DE) . |
| 40 34 839 | 3/1992 | (DE) . |
| 41 02 497 | 5/1992 | (DE) . |
| 691 00 262 | 6/1992 | (DE) . |
| 43 29 139 | 7/1994 | (DE) . |
| 195 38 794 | 4/1997 | (DE) . |
| 0 353 125 | 1/1990 | (EP) . |
| 0 470 858 | 2/1992 | (EP) . |

OTHER PUBLICATIONS

"Hydraulic Boosted Brake System with Proportional Valve ABS/TCS/Chassis Control/Smart Braking Intervention" Research Disclosure, No. 385, May 1996, p. 286 X000599711.

* cited by examiner ns system for motor vehicles, with a master
brake cylinder, a pressureless pressure medium reservoir, a
simulator which works in cooperation with a master brake
cylinder, a pressure source which can be controlled by
means of an electronic control unit, by means of which
pressure can be applied to the wheel brakes of the vehicle,
which source can be connected by means of at least one
hydraulic connection, which can be shut off with a separating valve, to the master brake cylinder, with a device for the
recognition of the driver's wish to slow down, as well as
with at least one separating piston arrangement, which is
connected before the wheel brakes, whose first chamber can
be connected to the master brake cylinder, and whose second
chamber can be connected through a valve device with the
pressure source or the pressure medium reservoir.

Such a brake actuation system is known, for example,
from DE 3,933,797 A1. The separating piston arrangement
which is connected before the wheel brakes, in the brake
actuation system of the prior art, presents two separating
pistons which are connected one after the other, and which
delimit two chambers to which are connected, on the one
hand, the pressure spaces of the master brake cylinder and,
on the other hand, in pairs, the wheel brakes. A chamber
which is connected before the first separating piston is
connected to the pressure source by means of a hydraulic
line, into which an electromechanically activated 2/2-way
valve is inserted, preferably one which is closed without
current. A second line which can also be shut off or opened
by a second 2/2-way valve, which can be actuated electromechanically and which is also closed without current,
connects the second chamber with the pressureless pressure
medium reservoir.

In the brake system of the prior art, a feature which
should be considered less advantageous is the digital control
of the 2/2-way valve, which is inserted in the connections
between the separating piston arrangement and the pressure
source or the pressure medium reservoir, because it results
in different maximum opening durations (pulse amplitude
and modulation), so that the valves are less suited for the
regulation or the metering of the hydraulic pressure which is
introduced in a controlled manner into the second chamber.

Consequently, the object of the present invention is to
improve an electronically controllable brake actuation system of the type mentioned in the introduction, in such a
manner that the metering of the brake pressure is considerably improved.

According to the invention, this object is achieved by the
construction of the valve device with a multiple position
valve of the slide type, and by the insertion of a switching
seat valve in the connection between the multiple position
valve and the pressure source.

Advantageous variants of the brake actuation system
according to the invention can be obtained from the Secondary Claims 2–17.

Figure 2:
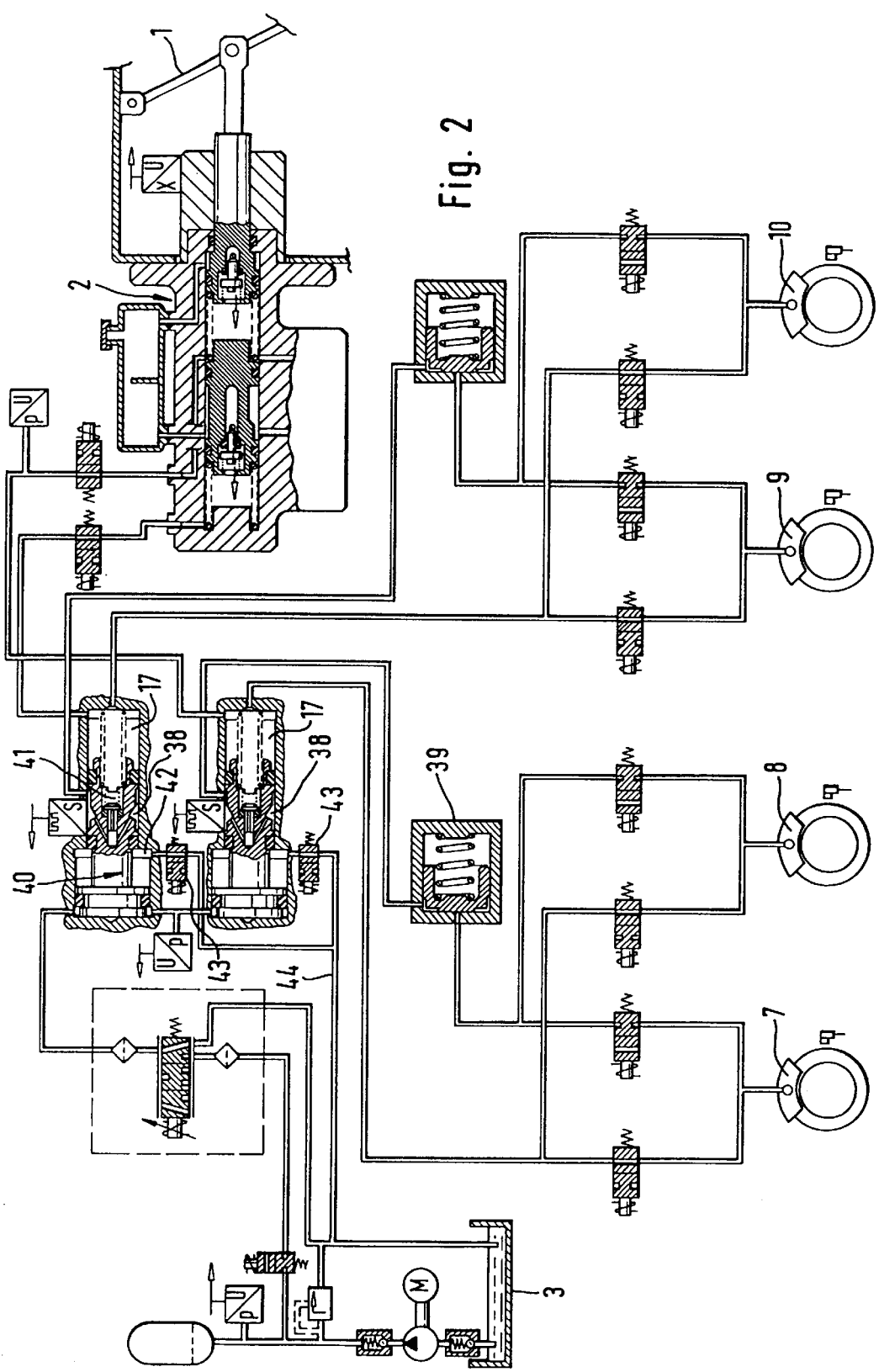
Figure 3:
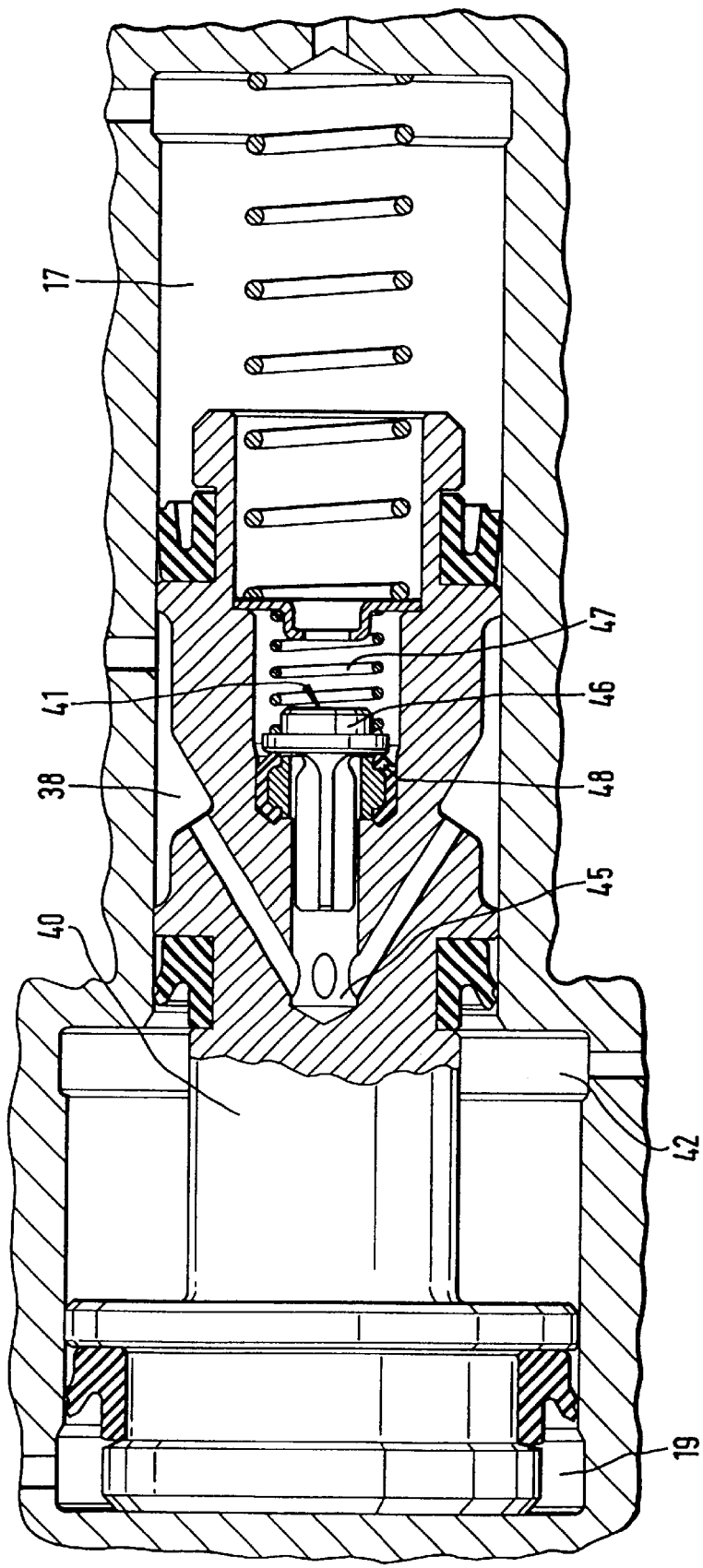
Figure 4:
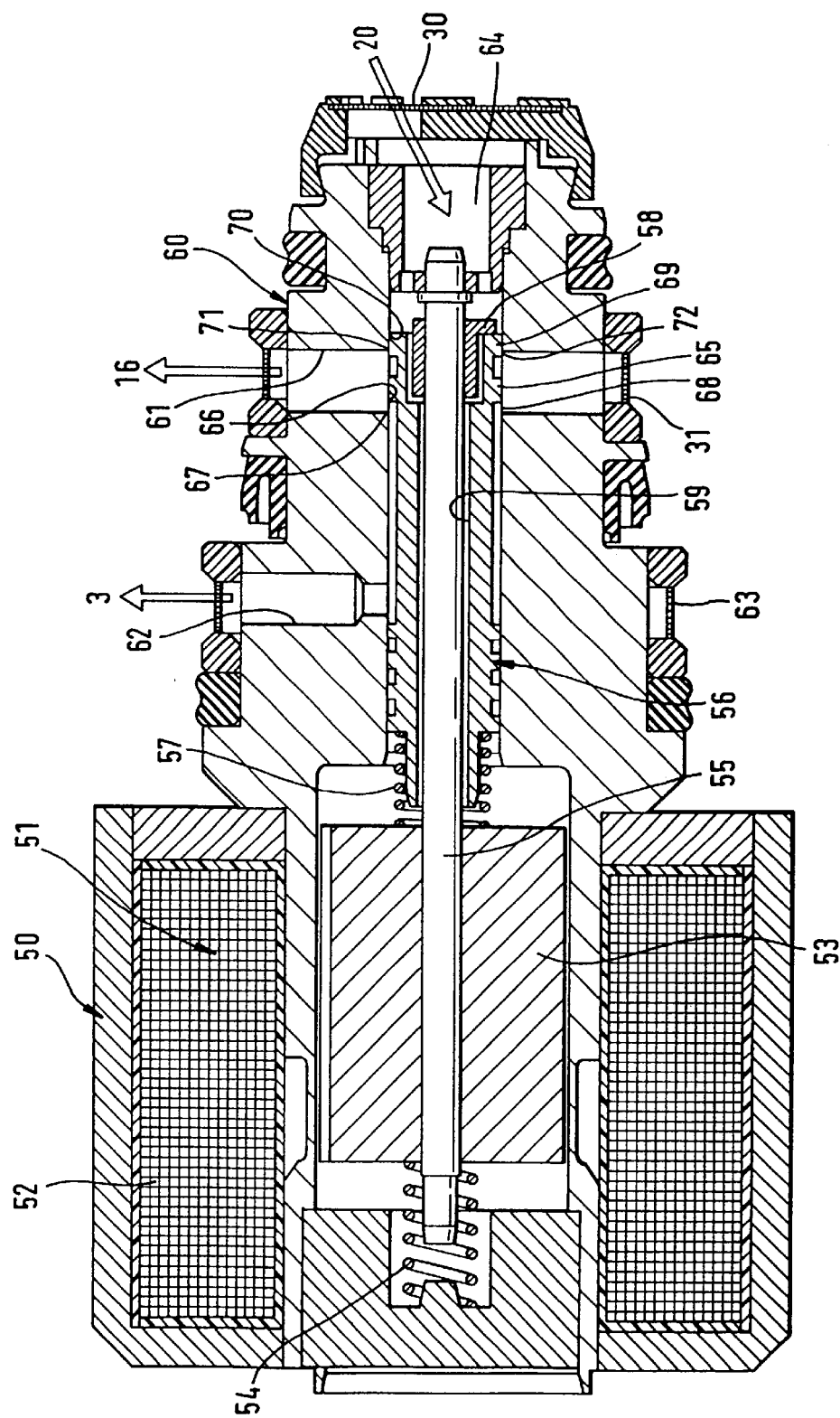
Figure 5:
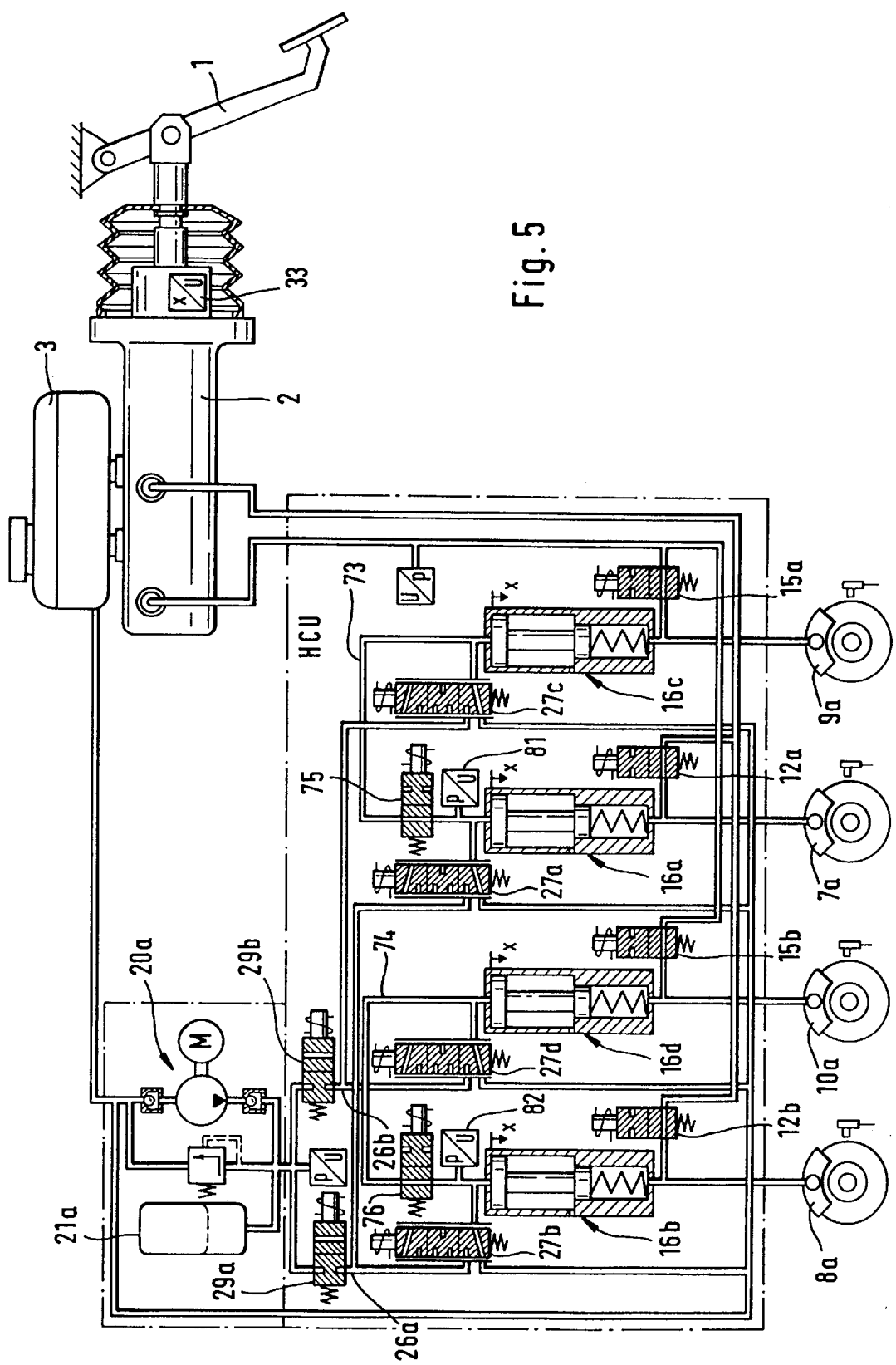
Figure 6:
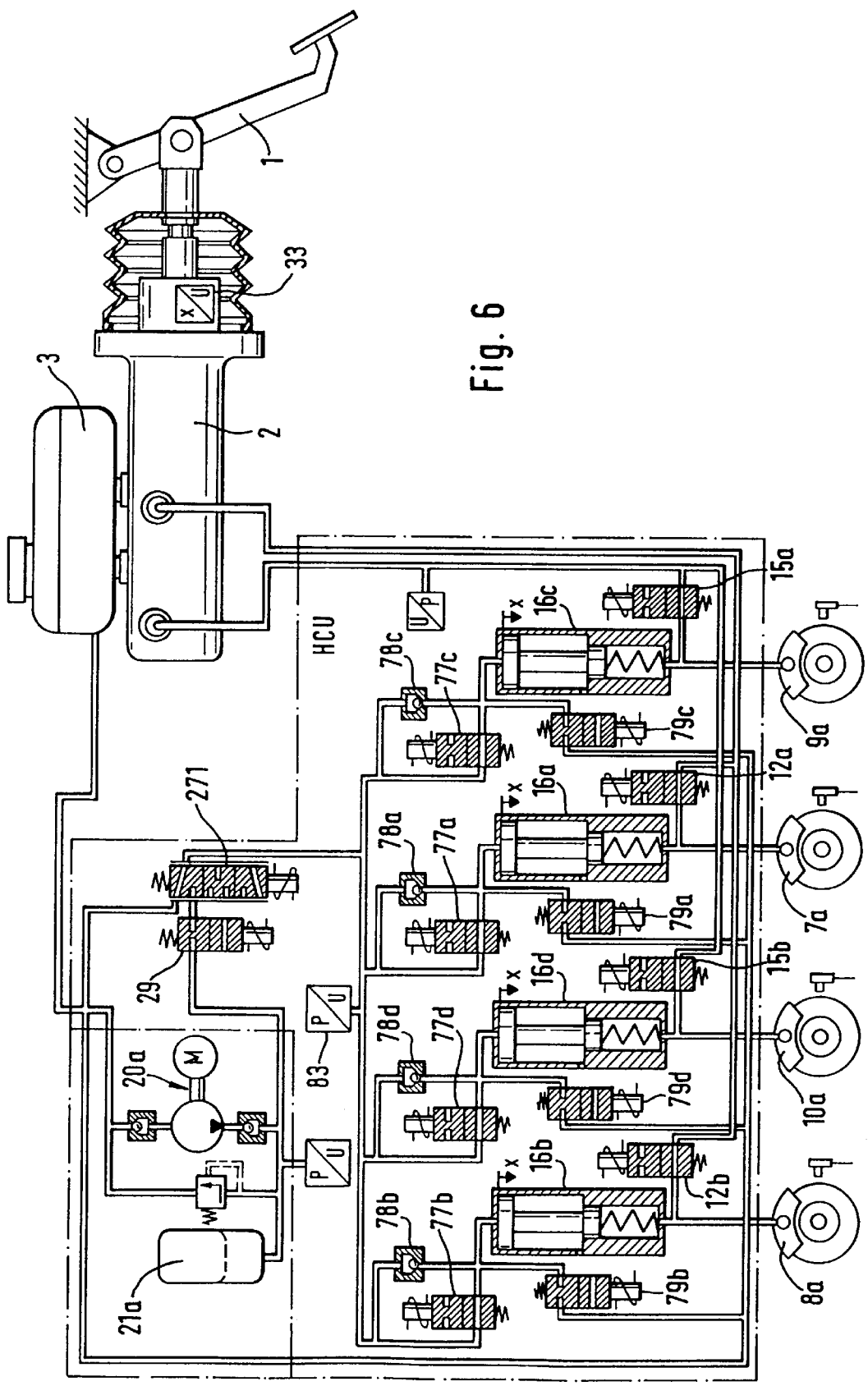
Figure 7:
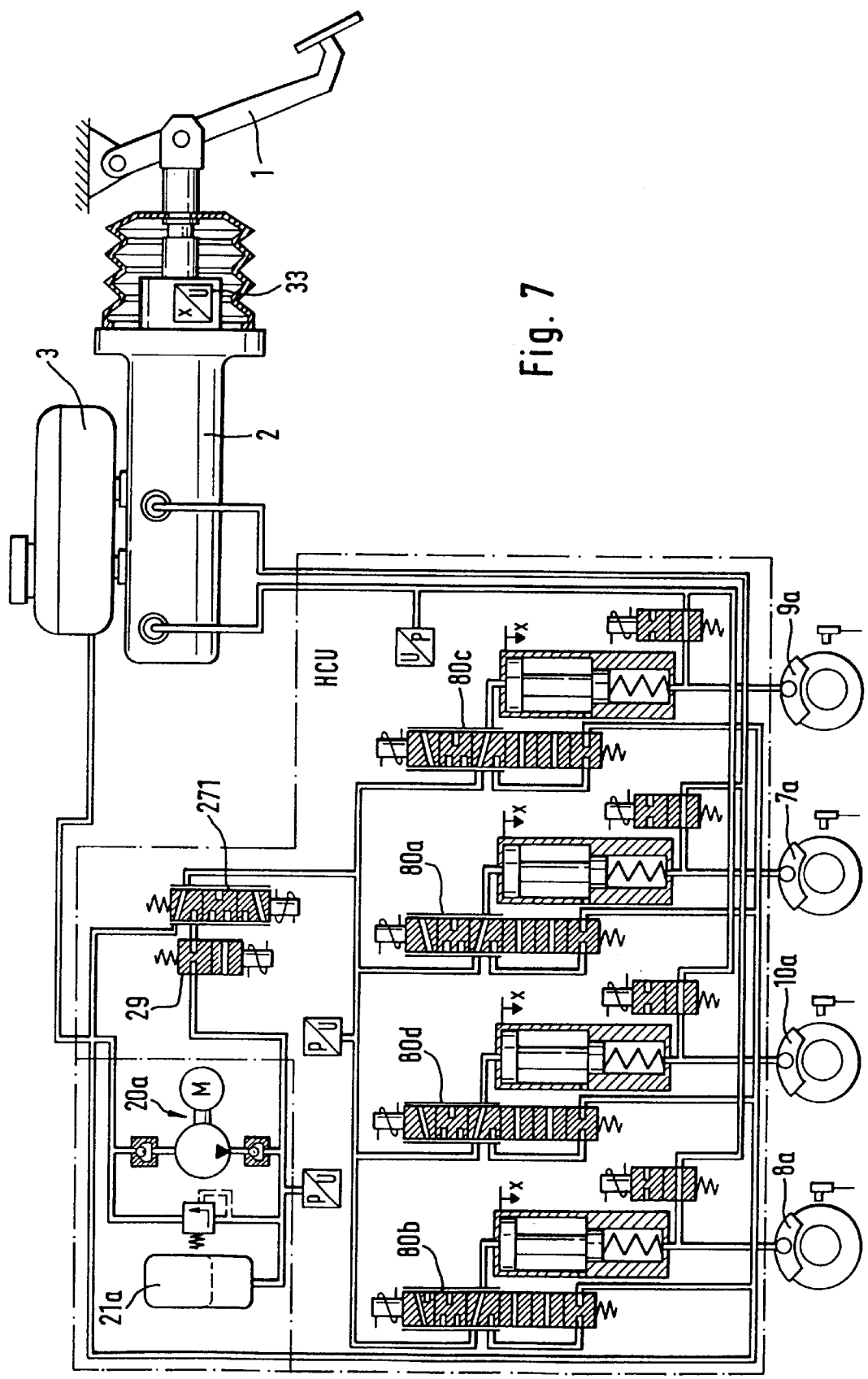

Other characteristics, advantages and details of the
invention can be obtained from the protection claims mentioned above as well as from the representation in drawings
and the following description of five embodiment examples,
with reference to the enclosed drawing which provides
further explanations. In the drawing:

FIG. 1 represents a diagram of a first embodiment of the
brake actuation system according to the invention, FIG. 2 represents a diagram of a second embodiment of
the brake actuation system according to the invention, FIG. 3 represents the separating piston arrangement
shown in FIG. 2, on a larger scale, FIG. 4 represents an embodiment example of the multiple position valve used in the brake actuation system
according to the invention, and FIGS. 5, 6 and 7 show the diagram of a third, fourth and
fifth embodiment of the brake actuation system according to
the invention.

The electronically controllable brake actuation system
according to the invention, represented in the drawing,
consists of a two-circuit master brake cylinder or tandem
main cylinder 2, which can be actuated by means of an
actuation pedal 1, which works in cooperation with a pedal
stroke simulator, not shown, and which presents two separate pressure spaces 36, 37, separated from each other by
two pistons 4, 5, which are in connection with a pressureless
pressure medium reservoir 3. A wheel brake 7, associated
with the front axle, and a wheel brake 8, associated with the
rear axle, for example, are connected by means of a first
hydraulic line 11 to the first pressure space 36 (primary
pressure space), to which a pressure sensor 13 can be
connected. The hydraulic connection which can be achieved
by means of the line 11 here advantageously leads through
a first chamber 17 of a separating piston arrangement 16,
which is delimited by a separating piston 18. The shutting off
of the line 11 occurs by means of a first separating valve 12,
whereas an electromagnetically actuated pressure equilibration valve, not shown, preferably an open valve which is
without current (S0), can be inserted in the line section
leading to the wheel brake 8, which allows an individual
brake pressure regulation for a single wheel if needed.

The second pressure space 37 of the master brake cylinder 2 can be connected by means of a second hydraulic
line 14, which can be shut off by means of a second
separating valve 15, to the other pair of wheel brakes 9, 10.
The connection of the wheel brake pair 7, 8 and 9, 10 here
advantageously occurs with the interposition of an ABS
modulator 6, which is only schematically indicated. In the
line section leading to the wheel brake 10, an electromagnetically actuated pressure equilibration valve, which is
preferably open and without current (S0) can again be
inserted. Since the construction of the hydraulic circuit
which is connected to the second pressure space 37 of the
master brake cylinder 2 is identical to the brake circuit 11
which has been explained in the above description, it will
not be further explained in the subsequent text.

As one can also see in the drawing, a motor-pump
aggregate 20, functioning as an extraneous pressure source,
with a high-pressure reservoir 21, is provided, which aggregate in turn consists of a pump 23 which is driven by an
electric motor 22 and a pressure equilibration valve 24
which is connected in parallel to the pump 23. The suction
side of the pump 23 is connected by means of a nonreturn
valve which is not further designated, to the abovementioned pressure medium reservoir 3, whereas the
hydraulic pressure which is applied by the pump 23 is
monitored by a pressure sensor 25. A third hydraulic line 26
connects the pressure side of the pump 23 or the highpressure reservoir 21 to a first inlet connection of an electromagnetically actuated 3/3-way slide valve 27, whose
second inlet connection is connected to a hydraulic line 28,
which in turn is connected to the pressureless pressure
medium reservoir 3. The outlet connection of the 3/3-way
valve 27 is connected to a second chamber 19 of the
above-mentioned separating piston arrangement 16. A ring
space 38, which is delimited by a section of the separating
valve 18, which has a smaller diameter, is connected to a pressure medium reservoir 3, and it serves the function of an after-run space of the first chamber 17. In addition, in the line 26 which leads to the 3/3-way slide valve 27, a switching seat valve 29 is inserted, which is preferably closed without current (SG) electromagnetically actuated 2/2-way valve, and with respect to which [sic] a first filter element 30 is connected. A second filter element 31 is connected after the outlet connection of the 3/3-way slide valve 27.

The joint control of the motor-pump aggregate 20, and, under some circumstances, the pressure modulator 6, as well as the electromagnetic valves 12, 15, 27 and 29 is achieved by means of an electronic control unit 32, which receives as input signals, the output signals of an actuation stroke sensor 33 which works in cooperation with the actuation pedal 1, and of the above-mentioned pressure sensor 13, allowing the recognition of the driver's desire to slow down. For the recognition of the driver's desire to a slow down it is, however, also possible to use other means, for example, a force sensor which senses the actuation force at the actuation pedal 1. Other possible input magnitudes which can be applied to the control unit 32 are output signals, from wheel sensors which are only schematically indicated, which signals correspond to the speed of the vehicle, as well as the output signal of a second pressure sensor 34 which monitors the pressure in the second chamber 19 of the separating piston arrangement, and the output signals of a stroke sensor 35 which determines the position of the separating piston 18.

The brake actuation system represented in FIG. 2 represents a so-called "closed" system in which the pressure medium volume which is removed during the decrease in the pressure from the brakes 7–10 is not led into the pressure medium reservoir 3 (see FIG. 1), but to the low-pressure accumulator 39. The separating piston 40, which is connected with the separating piston arrangement 16 mentioned in reference to FIG. 1, is designed in the embodiment shown as a stepped piston, whose smaller surface area delimits the above-mentioned first chamber 17, and is thus associated with the master brake cylinder 2, whereas the larger surface area is exposed to the effect of the pressure applied by the motor-pump aggregate 20. The after-run space 38 is connected, through channels formed in the separating piston 40, with the intermediate connection of a nonreturn valve 41 which opens toward the master brake cylinder 2, to the first chamber 17. In addition, the stepped piston 40 delimits, in a housing of the separating piston arrangement 16 which is only suggested, a second hydraulic ring space 42, which can be connected by means of a line 44, which can be shut off by means of a second switching seat valve 43, to the pressure medium reservoir 3.

The separating piston arrangement used in the brake actuation system according to FIG. 1 is represented on a larger scale in FIG. 3, in which one can see, in particular, the construction of the nonreturn valve 41 which is centrally arranged in the separating piston 40. The nonreturn valve 41 here preferably consists of a valve body 46, which is pre-stressed by a valve spring 47, and which is placed in a central bore 45, and works in cooperation with a ring-shaped sealing seat 48 made of elastic material. The design of the valve spring 47 must, preferably, be such that it yields during the expulsion of the pressure medium out of the low-pressure accumulator 39, and opens the connection between the after-run space 38 and the first chamber 17.

The construction of the above-mentioned 3/3-way slide valve 27 can be seen in particular in FIG. 4. The reference numeral 50 denotes a housing block which accommodates an electromagnetic drive 51. The electromagnetic drive 51 comprises a coil 52 as well as an anchor 53 which can be shifted in the longitudinal direction of the valve, and which is pre-stressed against the direction of actuation by means of a spring 54. A push rod 55 is connected in a force-transfer connection to the anchor 53, where the rod works in cooperation with a slide 56, which is applied, with prestress by second spring 57, against an abutment 58 which is provided at the punching rod 55, and which slide presents an opening 59 which runs through the entire length in longitudinal direction.

On the right side, in the drawing, of the housing block 50, a sheath-shaped housing body 60 is provided, which accommodates the slide 56 in a longitudinal direction, and in a manner which allows shifting. Each sheath-shaped housing body 60 presents two radially extended openings 61, 62, which are separated from each other in the longitudinal direction, and the above-mentioned filter 31 or a second filter 62 is inserted after them. The radial opening 61 forms an outlet connection of the 3/3-way slide valve 27, whereas the opening 62 forms a connection, which is in connection with the pressure medium reservoir 3. On the side of the sheath-shaped housing body 60 which is turned away from the housing block 50, the longitudinal opening 59 opens into a connection 64, to which the pressure side of the pressure source 20 is connected.

The sheath-shaped housing body 60 is accommodated, in a sealing manner, in a housing block which is not further represented.

A first radial collar 65, which is provided on the slide 56, forms a first guiding edge 66 which, together with a corresponding guiding edge 67 of the sheath-shaped housing body 60, forms to first variable throttle cross section 68 between the connection 61 which is associated with the separating piston arrangement 16 (FIGS. 1, 2), and which forms the radial opening 62 which is associated with the pressure medium reservoir 3.

The slide 56 is designed as a hollow slide, so that it is possible to establish, through the bore 59, a pressure and flow communication between its section which is in contact with the connection 64 on the side of the pressure source and the section which is in contact with its front side on the anchor side, so that a pressure equilibration takes place. A second radial collar 69 of the slide 56 forms a second guiding edge 70, which forms, with a corresponding guiding edge 71 of the housing body 60, a second variable throttle cross section 72 between the pressure source 20 and the separating piston arrangement 16, which can be opened or closed by shifting the slide 56.

FIG. 4 is a representation of the valve device 27 in its starting position. The slide 56 is in the currentless state of the electromagnetic drive 51 under preliminary tension caused by the spring 57 in its first end position, in which the throttle cross section 68 between the separating piston arrangement 16 and the pressure medium reservoir 3 is opened as much as possible. The guiding edge 70 toward the pressure source 20 has moved over the guiding edge 71, so that, as far as flow is concerned, the pressure source 20 is separate from the separating piston arrangement 16.

The brake actuation system represented in FIGS. 1 and 2 operates as follows: In the starting or rest state, all the elements in the switching position shown in the drawing, in which the seat valves 12, 15 are open and the seat valve 29 is closed, allow a connection between the second chamber 19 of the separating piston arrangement 16 and the pressurized agent reservoir 3, during the time that the stroke slide valve 27 is in the shown switch position. Naturally, it is also possible to imagine another switch position of the slide valve 27, which is not shown, and in which a connection between the pressure source 20 and the second chamber 19 is created.

When a brake process is started by pushing down the brake actuation pedal 1, or if the brake control and regulation device 32 detects the driver's wish to slow down, by recognizing the actuation state of the actuation stroke sensor 33, the electronic control unit 32 generates control signals, which effect a switching of the valves 12 and 15 and thus a separation of the main cylinder from the wheel brakes 7–10. As a result of the pressure sensor 13, a second report of the driver's wish to slow down occurs, or the application of an actual pressure value to the electronic control unit 32, which generates control signals for the switching seat valve 29, which is then switched and it opens the connection 26. At the same time, the 3/3-way slide valve 27 is switched into its third switch position, during which process the electromagnetic drive 51 receives current, and the anchor is moved against the action of the spring 54 in the longitudinal direction in its second final position to the left. During this process, the slide 56 is moved in the same direction, so that the guiding edge 70 of the slide 56 sweeps over the guiding edge 71, and thus the progressively increasing flow cross section 72, between the pressure source 20 or the high-pressure reservoir 21, and the separating piston arrangement 16 or the second chamber 19, is opened, so that the separating piston 18 or 40 in the drawing is shifted to the right, and a pressure buildup occurs in the second chamber 19, and thus an increase in pressure is led into the wheel brakes 7, 8, 9 and 10. The feeling of the pedal, which can usually be sensed by the driver during the braking process, is ensured as a result of the action of the above-mentioned pedal stroke simulator, which is not shown.

In order to start a reduction in the pressure it is necessary that the springs 54, 57 set the slide 56 back until the flow cross section 68 is opened, and the connection between the separating piston arrangement 16 and the pressure medium reservoir 3 is opened. However, before the flow cross section 68 is opened, the guiding edge 70 of the slide 56 moves beyond the corresponding guiding edge 71, so that the pressure source 20 is separated. It is only after that step that the flow cross section 68 leading to the pressure medium reservoir 3 is opened.

In the second switch position of the 3/3-way slide valve 27, the connections of the second chamber 19 are shut off, both with the pressure source 20 and with the pressure medium reservoir 3 (pressure maintenance phase).

After the pressure requirement p=0 has been met, the switching seat valve 29, inserted in the connection to the pressure source 20 or the high-pressure reservoir 21, is closed.

In the third embodiment of the object of the invention, represented in FIG. 5, the wheel brakes 7a–10a are connected, in pairs, to the master brake cylinder 2 and the pressure source 20a, 21a in such a manner that the wheel brakes 7a and 8a are connected to the line 11 which is associated with the first main cylinder pressure space or to a first line section 26a, associated with the pressure source 20a, 21a, and the wheel brakes 9a and 10a are connected to the line 14, which is associated with a second main cylinder pressure space, or to a second line section 26b, which is associated with a pressure source 20a, 21a. Here, each wheel brake 7a–10a has a separating valve 12a, 12b, 15a, 15b which is connected before it, allowing the separation of the corresponding wheel brake from the master brake cylinder 2. Into the above-mentioned line sections 26a, 26b, switching seat valves 29a, 29b are inserted, by means of which the line sections 26a, 26b can be separated from the pressure source 20a, 21a. In addition, every wheel brake 7a–10a is associated with a separating piston arrangement 16a–16d, each one of which having a 3/3-way slide valve 27a–27d associated with it, and connected before it. A pressure equilibration between the wheel brakes 7a and 9a or 8a and 10a [occurs] by means of pressure equilibration lines 73 and 74, in which open pressure equilibration or switching seat valves 74, 75 without current are inserted, valves which are switched only when a pressure regulation specific for a given wheel is to take place. The determination of the pressure values applied to the separating piston arrangements 16a–16d is ensured by means of the pressure sensors 81 and 82, which are inserted in the pressure equilibration lines 73 and 74.

The system represented in FIG. 6 largely corresponds to the switch arrangement which was explained in connection with FIG. 5. In this embodiment, the above-mentioned 3/3-way slide valves have each been replaced by a combination of two switching seat valves 77a–d, 79a–d, preferably with a nonreturn valve 78a–d which opens toward the pressure source 20a, 21a. Here, the switching seat valves 77a–d, which are inserted in the connection between the pressure source 20a, 21a and the separating piston arrangement 16a–d, and with respect to which the nonreturn valves 78a–d are switched in parallel, are constructed as electromagnetically actuated 2/2-way valves which are preferably open and without current (S0), whereas the switching seat valves 79a–d which are inserted between the separating piston arrangement 16a–d and the pressure medium reservoir 3 are designed as 2/2-way valves which are closed without current (SG). The hydraulic pressure which is established by means of the 3/3-way slide valve 271 is here monitored by a pressure sensor 83. Lastly, in the fifth embodiment of the brake actuation system according to the invention, shown in FIG. 7, 3/3-slide seat valves 80a–d are arranged between the above-mentioned multiple positions or 3/3-way slide valve 271, which replace, in their operation, the valve combination described in connection with FIG. 6.

We claim:

1. An electronically controllable brake actuation system for motor vehicles, comprising:

a master brake cylinder;

a plurality of wheel brakes;

a pressureless pressure medium reservoir;

a pressure source which can be controlled by means of an electronic control unit, by means of which pressure can be applied to the wheel brakes of the vehicle by means of at least one hydraulic connection to the master brake cylinder, which hydraulic connection can be shut off by means of a separating valve;

a device for the recognition of an intended slow-down; at least one separating piston arrangement which is connected before the wheel brakes, where a first chamber of this separating piston arrangement can be connected to the master brake cylinder, and a second chamber can be connected through a valve device to the pressure source or to the pressure medium reservoir, the valve device being constructed as a multiple position slide valve;

a switching seat valve inserted in the connection between the multiple position valve and the pressure source;

wherein the separating piston arrangement includes a stepped piston with a larger and a smaller surface, the larger surface being associated with the pressure source and the smaller surface being associated with a wheel brake;

wherein the separating piston delimits a third chamber, which can be connected to the pressure medium reservoir by means of a closable hydraulic connection;

wherein the separating piston delimits a hydraulic space, to which a low-pressure accumulator associated with the wheel brakes is connected and which can be connected to the first chamber by means of a nonreturn valve permitting a fluid flow in the direction of the master brake cylinder.

2. A system according to claim 1, wherein means are provided for sensing the position of the separating piston arrangement.

3. A system according to claim 1, wherein a simulator is provided which works in cooperation with the master brake cylinder.

4. A system according to claim 1, wherein the multiple position valve is designed as a 3/3-way slide valve which can be controlled by analog means, which, in a first switching position, shuts off the connection between the pressure source and the second chamber and establishes a communication between the second chamber and the pressure medium reservoir; in a second switching position, it turns off the connection between the pressure source and the second chamber as well as the connection between the second chamber and the pressure medium reservoir; and, in a third switch position, it establishes a connection between the pressure source and the second chamber, and shuts off the connection between the second chamber and the pressure medium reservoir.

5. A system according to claim 4, wherein the multiple position valve presents a slide which is located in a sheath-shaped housing body and has a first and a second guiding edge, where the first guiding edge forms, together with a corresponding first guiding edge at the housing body, a first variable flow cross section, which controls the hydraulic connection between the second chamber and the pressureless pressure medium reservoir, and the second guiding edge forms, with a second guiding edge at the housing body, a second variable flow cross section, which controls the hydraulic connection between the second chamber and the pressure source.

6. A system according to claim 5, wherein the slide has two end surfaces and is constructed in a hollow design with a bore establishing a connection of both end surfaces with the pressure source.

7. A system according to claim 5, wherein the multiple position valve is biased toward the first switch position.

8. A system according to claim 5, wherein, in the first switching position of the slide, the first variable flow cross section presents its largest opening.

9. A system according to claim 5, wherein means are provided which allow the sensing of the slide position and whose output signals can be applied to an electronic controller which influences the electromagnetic drive.

10. A system according to claim 5, wherein the slide is driven by a proportional magnet.

11. A system according to claim 10, wherein the connection which is associated with the pressure source is constructed at the side of the housing body which is turned away from the proportional magnet.

12. A system according to claim 1, wherein four wheel brakes are connected, in pairs, both to the master brake cylinder and to the pressure source; wherein each wheel brake is associated with a separating valve, a separating piston arrangement and a multiple position valve; and wherein the connections between the wheel brake pairs, and the pressure source can each be shut off or opened by means of a switching seat valve.

13. A system according to claim 12, wherein the separating piston arrangements associated with the wheel brakes of each pair are connected by means of pressure equilibration lines, in which pressure equilibration valves are inserted.

14. A system according to claim 1, wherein four wheel brakes are connected, in pairs, both to the master brake cylinder and to the pressure source, wherein each wheel brake is associated with a separating valve and a separating piston arrangement, and wherein, between the multiple position valve and each separating piston arrangement, a parallel connection of a switching seat valve is inserted which has a nonreturn valve allowing a fluid flow toward the pressure source, and wherein, between the separating piston arrangements and the pressure medium reservoir, a second switching seat valve is inserted.

15. A system according to claim 1, wherein four wheel brakes are connected in pairs, both to the master brake cylinder and to the pressure source; wherein each wheel brake is associated with a separating valve and a separating piston arrangement; and wherein, between each multiple position valve and the separating piston arrangements, a 3/3-slide seat valve is inserted, in whose first switch position, the outlet connection of the multiple position valve is in communication with the separating piston arrangement and the separating piston arrangement is separated from the pressure medium reservoir, and in whose second switch position, the separating piston arrangement is separated both from the multiple position valve and also from the pressure medium reservoir, and, in whose third switch position, the separating piston arrangement is separated from the multiple position valve and in connection with the pressure medium reservoir.

16. An electronically controllable brake actuation system for motor vehicles, comprising:
- a master brake cylinder;
- a plurality of wheel brakes;
- a pressureless pressure medium reservoir;
- a pressure source which can be controlled by means of an electronic control unit, by means of which pressure can be applied to the wheel brakes of the vehicle by means of at least one hydraulic connection to the master brake cylinder, which hydraulic connection can be shut off by means of a separating valve;
- a device for the recognition of an intended slow-down;
- at least one separating piston arrangement which is connected before the wheel brakes, where a first chamber of this separating piston arrangement can be connected to the master brake cylinder, a second chamber can be connected through a valve device to the pressure source or to the pressure medium reservoir, and a third chamber can be connected to the pressure medium reservoir, the valve device being constructed as a multiple position slide valve; and
- a switching seat valve inserted in the connection between the multiple position valve and the pressure source.

17. An electronically controllable brake actuation system for motor vehicles, comprising:
- a master brake cylinder;
- a plurality of wheel brakes;
- a pressureless pressure medium reservoir;
- a pressure source which can be controlled by means of an electronic control unit, by means of which pressure can be applied to the wheel brakes of the vehicle by means of at least one hydraulic connection to the master brake cylinder, which hydraulic connection can be shut off by means of a separating valve;

a device for the recognition of an intended slow-down; at least one separating piston arrangement which is connected before the wheel brakes, where a first chamber of this separating piston arrangement can be connected to the master brake cylinder, and a second chamber can be connected through a valve device to the pressure source or to the pressure medium reservoir, the valve device being constructed as a multiple position slide valve;

a switching seat valve inserted in the connection between the multiple position valve and the pressure source;

wherein the multiple position valve is designed as a 3/3-way slide valve which can be controlled by analog means, which, in a first switching position, shuts off the connection between the pressure source and the second chamber and establishes a communication between the second chamber and the pressure medium reservoir; in a second switching position, it turns off the connection between the pressure source and the second chamber as well as the connection between the second chamber and the pressure medium reservoir; and, in a third switch position, it establishes a connection between the pressure source and the second chamber, and shuts off the connection between the second chamber and the pressure medium reservoir;

wherein the multiple position valve presents a slide which is located in a sheath-shaped housing body and has a first and a second guiding edge, where the first guiding edge forms, together with a corresponding first guiding edge at the housing body, a first variable flow cross section, which controls the hydraulic connection between the second chamber and the pressureless pressure medium reservoir, and the second guiding edge forms, with a second guiding edge at the housing body, a second variable flow cross section, which controls the hydraulic connection between the second chamber and the pressure source;

wherein the slide is driven by a proportional magnet to claim 11;

wherein the connection which is associated with the pressure source is constructed at the side of the housing body which is turned away from the proportional magnet.

* * * * *